Jan. 19, 1932. R. D. POOLE Re. 18,338

LAST

Original Filed Feb. 5, 1930

INVENTOR.

Roscoe D. Poole

By his Attorney,

Harlow W. Davis

Reissued Jan. 19, 1932

Re. 18,338

UNITED STATES PATENT OFFICE

ROSCOE D. POOLE, OF DANVERS, MASSACHUSETTS, ASSIGNOR, BY DIRECT AND MESNE ASSIGNMENTS, TO UNITED SHOE MACHINERY CORPORATION, OF PATERSON, NEW JERSEY, A CORPORATION OF NEW JERSEY

LAST

Original No. 1,806,417, dated May 19, 1931. Serial No. 426,120, filed February 5, 1930. Application for reissue filed July 20, 1931. Serial No. 552,032.

My invention relates to boot and shoe lasts and it has for its object to provide a last having improved attaching means for retaining a shoe part thereon. The invention is illustrated in connection with a sole attaching problem in stitchdown and turn shoe making.

In the manufacture of certain kinds of boots and shoes, particularly stitchdown and turned shoes, it is the practice to place both the sole and the upper upon a last to which they are held while the upper is sewed to the sole.

The usual practice has been to secure the sole to the last by means of two tacks, one driven through the sole into the bottom of the last at the fore part of the latter and the other driven into the bottom of the last adjacent the heel thereof. These two tacks were depended upon to hold the sole in proper position with relation to the last while the upper was being sewed, or otherwise fastened, to the sole.

This old method was objectionable for the reason that the sole was mutilated and disfigured by the tacks and the repeated or continued driving of tacks into the bottom of the last soon destroyed the latter or rendered it unfit for use. Furthermore the shoemaker would often drive a tack through the sole and into the last and then, if the sole was not in correct position with relation to the last, it was necessary for him to remove one or both of the tacks and after readjusting the sole again fasten it to the last by means of two tacks. Owing to the fact that these tacks were usually driven fully into the sole so that the heads thereof were flush with the tread side of the latter, the removal of a tack could not be effected by means of a tack-pulling instrument without further mutilation and disfigurement of the tread side of the sole.

Heretofore it has been proposed to construct a two-part last with two or more spike members movably mounted in sockets or chambers at the bottom of the last and operated by relative movement of the two parts of the last so that when said two parts were adjusted relatively for use the barbs of the spike members were projected from the bottom of the last into the sole, and when adjusted relatively for removal of the last from the shoe said barbs would be retracted. Lasts constructed in this fashion did not fully meet the requirements for the reason that the spike members served only to hold the sole against sliding displacement relatively to the last. So far as I am aware there has been no last construction heretofore proposed which would function to positively fasten the sole to the bottom of the last so as to hold it against bodily movement directly away from the latter.

My invention provides a last for use in making boots and shoes provided at its bottom with means for positively engaging and locking a sole in position against the bottom thereof so that said sole cannot either slide with relation to, or move bodily away from, the last.

In the best form of my invention, as applied to holding soles, the sole-engaging means of the last does not project beyond the tread of the sole and it operates to hold the latter in position against the bottom of the last by engagement with the top portion only of the sole so that the bottom of the latter is not disfigured or mutilated.

Thus by my invention the use of tacks is obviated as are also the objectionable features above pointed out as characterizing the constructions heretofore proposed.

Figure 3:
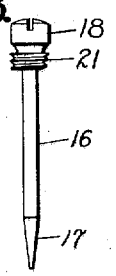
Fig. 3 is an elevation of the forepart spike member hereinafter described.

The body 1 of the last herein illustrated is made from one piece of material, preferably wood, and may be provided, as usual, with a socket 2 to receive the spindle of a jack.

Near its rear end the body 1 is formed with a vertical bore into which is forcibly driven, or otherwise fixed, a tubular bushing 3 whose interior provides a chamber 8 for a sole-engaging screw-member 4 provided with a slotted head 5 which may be reached and operated by means of a screw driver inserted in the upper open end of the bushing 3.

At its lower end the screw-member 4 is more or less pointed and formed with a screw thread 6 so that, by means of the screw driver referred to, the member 4 can be forced downwardly against a sole 7 placed beneath the last body 1, and then rotated thereby to screw the lower end of the latter into the material of the sole 7 from the top side thereof. The thread of the screw indents the soles material laterally as the screw enters, and forms overhanging portions in the material which engage with the thread to hold the sole positively to the last against stresses in any direction tending to separate it from the last.

The chamber 8 provided by the bushing 3 is formed with an annular shoulder 9 which serves as a stop against which the lower end of the head 5 of screw-member 4 is brought to bear to limit the downward movement of the latter. This shoulder 9 is positioned so that the lower threaded end 6 of screw-member 4 cannot be projected below the bottom of the last more than a desired distance, as the thickness of the sole 7.

As means for yieldingly holding the screw-member 4 retracted and sheathed within its bushing 3 when not in use I provide a coiled spring 10 bearing at its lower end against an annular shoulder 11 provided within the bushing 3, and at its upper end against the head 5. When screw-member 4 is rotated in a direction to disengage it from the sole 7 the spring 10 moves said screw-member inwardly and upwardly until its head 5 comes to bear against an annular shoulder 12 provided within the bushing 3 near the upper end thereof. This shoulder 12 is the lower end of a sleeve or ferrule 13 fixed in position within the upper end of bushing 3.

It will be clear that when the screw-member 4 is in threaded engagement with the material of the sole 7 the heel portion of the latter is not only held against sliding displacement in any direction with relation to the last, but it is also fastened to the last so that it is held against bodily movement away from the same.

The forepart of the illustrated last is made with an obliquely disposed bore into which is forced, or otherwise fixed, a tubular bushing 14 providing a chamber 15 within which is movably mounted a spike member 16 having its lower end portion made as a smooth needle point 17 and its upper end with a slotted head 18.

Near its lower end the bushing 14 is made with an annular shoulder 19 providing an abutment-seat for one end of a coiled spring 20 surrounding the shank of spike-member 16 and bearing at its upper end against the head 18.

Figure 4:
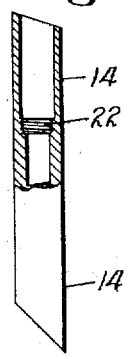
Fig. 4 is an elevation, partly in section, of the bushing provided for the spike member of Fig. 3.

As shown in Fig. 3 the lower end portion of the head 18 is made upon its exterior with two or three screw thread convolutions 21 to cooperate with two or three screw thread convolutions 22 provided within bushing 14, said threads 22 being shown clearly in Fig. 4.

Adjacent the upper end of the bushing 14 the latter is also provided upon its interior with an annular shoulder 23 which is the inner end of a short sleeve or ferrule 24 fixed in position within said bushing. Thus the upper end of the bushing 14 is open to admit a screw driver by means of which the spike-member 16 may be operated.

Figure 1:
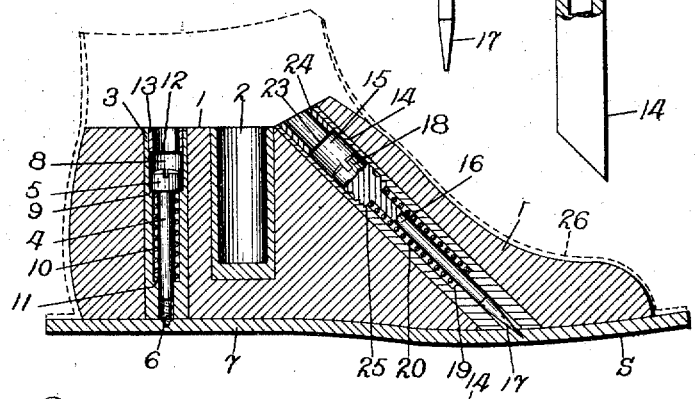
Fig. 1 is a longitudinal sectional view of a boot and shoe last constructed in accordance with my invention showing a sole attached thereto and indicating, by dotted lines, the upper of a shoe.
Figure 2:
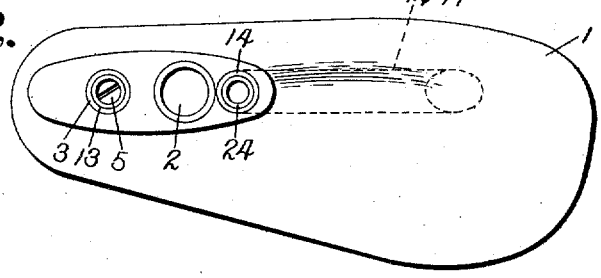
Fig. 2 is a plan view of the last shown in Fig. 1.

In Fig. 1 of the drawings the threads 21 of spike-member 16 are shown as in engagement with the threads 22 of bushing 14, and the inner end of the head 18 is shown as bearing against an annular stop-shoulder 25 provided within said bushing. With the spike-member 16 in this position its lower pointed end 17 is projected beyond the bottom of the last into the sole 7 and it will be clear that, because of the oblique disposition of the axis of bushing 14 with respect to the axis of the bushing 3, the sole cannot slide downwardly off from the pointed end 17 for the reason that to do so said sole must move forward with relation to the last which it can not do because it is held against sliding movement in that direction by the lower end of the screw-member 4.

Thus, when screw-member 4 and spike-member 16 are both in engagement with the sole of the shoe that is being made, said sole cannot be displaced in any direction relatively to the last, and furthermore, since neither the screw-member 4 nor the spike-member 16 perforates the sole, the outer tread side of the latter will not be marked or disfigured in any way. Thus my invention provides means for positively engaging the top side portion only of the sole to fasten the latter to the last and hold it against displacement in any direction.

To disengage the spike-member 16 from the sole 7, said spike-member is rotated in a direction to unscrew the threads 21 from the threads 22 and as soon as these threads are disengaged the spring 20 shoves the spike-member upwardly into position against the stop shoulder 23, thereby sheathing the lower end of said spike-member wholly within the bushing 14.

It will therefore be clear that when the last is not in use the pointed ends of the numbers 4 and 16 are wholly inclosed and therefore cannot engage or injure other things with which the last may come into contact.

It will also be clear that I have provided very simple and efficient means for fastening the sole to the last against displacement relatively thereto while it is being sewed or otherwise fastened to the upper of the shoe, the latter being indicated by dotted lines at 26, Fig. 1.

Figure 5:
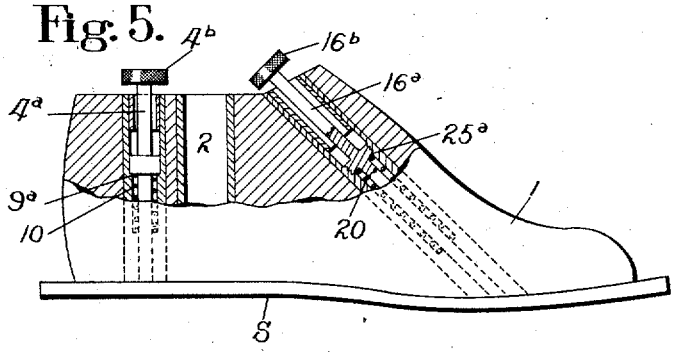
Fig. 5 illustrates an alternative construction.

In Fig. 5 I have illustrated an alternative construction wherein the spike-member 16*a* is extended upwardly beyond the top of the last and provided with a finger piece or head 16*b* by means of which it is manipulated. Also, the screw-member 4*a* at the heel of the last is extended upwardly beyond the top of the latter and provided with a finger piece 4*b* by means of which it is manipulated. In this form of the invention the use of a screw driver is dispensed with.

It will be noted that the shoulder 9*a* is positioned so as to stop the downward movement of the screw-member 4*a* before the lower pointed end thereof passes through the sole S. Likewise the shoulder 25*a* arrests the downward movement of the spike-member 16*a* before the lower end thereof is forced entirely through the sole.

It will therefore be clear that the tread side of the sole S is not in any way mutilated or marked by the means through which it is secured to the last during the operation of making the shoe.

It will also be clear that the members 4, 4*a*, 16 and 16*a* are a permanent part of the last structure. They have limited movement in the chambers they occupy but they permanently remain in these chambers.

Having described my invention, what I claim as new and desire to secure by Letters Patent of the United States is:

1. A last having its forepart made with an obliquely disposed chamber extending from the top of the last forwardly to the bottom thereof and its heel part made with a vertically disposed chamber extending from the top of the last to the bottom thereof, a sole-engaging spike-member adjustably mounted within said obliquely disposed chamber, and a sole-engaging screw-member adjustably mounted within said vertically disposed chamber, said two members being operable to engage and disengage a sole and when in engagement with the latter serving to hold said sole against displacement in any direction relatively to the last.

2. A last constructed in accordance with claim 1 wherein each member is rotatably mounted within its chamber and wherein means is provided for moving said spike-member longitudinally in its chamber toward and from the sole when said member is rotated and for holding said spike-member in its sole-engaging position.

3. A last constructed in accordance with claim 1 wherein each member is rotatable and also endwise movable in its chamber and including also means rendered effective by rotary motion of said spike-member in one direction to hold the same in its sole-engaging position, and spring means for yieldingly holding both of said members retracted and sheathed within their respective chambers when said screw-member is not in engagement with a sole and wherein said holding means is rendered ineffective by rotary motion of said spike-member in the opposite direction.

4. A last having a chamber extending through it from top to bottom, and a shoe part attaching member longitudinally movable in said chamber and operable from the upper end of the chamber to project beyond the bottom of the last to engage a shoe part, said shoe part attaching member being provided with means for positively holding said shoe part in attachment to the last, and stop means preventing withdrawal of said member in either direction.

5. A last having a chamber opening through the bottom surface of its heel part, and a shoe part attaching member, having a threaded end and having limited movement in said chamber whereby its threaded end may be projected through the said opening in the bottom surface of the heel part, and stop means preventing withdrawal of said member in either direction.

6. A last having a chamber extending through it from top to bottom, the upper end of the chamber being reduced in size relatively to its middle portion, a shoe part attaching member located in said chamber and having a portion which is too large to pass the reduced upper end of the chamber but which can move freely in the middle portion thereof, and which has a portion which can be projected through the bottom end of the chamber to engage a shoe part, said projecting portion being constructed and arranged to hold the shoe part positively against stresses in any direction tending to pull it from the last.

7. A last having a chamber extending through it from top to bottom, a shoe part attaching member rotatable and longitudinally movable in said chamber, said attaching member having a threaded end and being operable from the upper end of the chamber to project its threaded end beyond the bottom of the last to engage a shoe part, and a spring in said chamber normally acting to retract the lower end of the attaching member into the last.

8. A last having a chamber opening through the bottom surface of its heel part, a shoe part attaching member, having a threaded end, confined in said chamber and having limited movement in said chamber whereby its threaded end may be projected through the said opening in the bottom surface of the heel part, and resilient means normally acting to retract the lower end of the attaching member into the last.

9. A last having a chamber extending through it from top to bottom, the upper end of the chamber being reduced in size relatively to its middle portion and having an abutment in its lower portion, a shoe part attaching member located in said chamber and having a part which is too large to pass the reduced upper end of the chamber but which can move freely in the middle portion thereof, and which has a shoe part engaging portion which can be projected through the bottom end of the chamber, said shoe part engaging portion having its entire periphery constructed to engage an overhanging portion of the shoe part, to hold the shoe part positively against stresses in any direction tending to pull the shoe part from the last and a spring located between the said abutment and the first-named part of the shoe part attaching member, to hold the lower end of said member normally retracted into the last.

10. A last having a chamber in its heel part opening at both top and bottom of the heel part, a headed screw having a threaded end loosely positioned in said chamber in such manner that its threaded end may be projected beyond the bottom of the heel part to engage a shoe part, the upper end of said chamber being constructed to provide an abutment limiting upward motion of the screw, a spring coiled around the shank of the screw under the head to retract the threaded end of the screw into the last, and an abutment for the lower end of the spring.

In testimony whereof I have signed my name to this specification.

ROSCOE D. POOLE.